July 11, 1961  P. L. SPEICHER  2,992,008
BROADCAST SPREADER
Filed Oct. 27, 1959  3 Sheets-Sheet 1

INVENTOR
PAUL L. SPEICHER
BY Kimmel & Crowell
ATTORNEYS

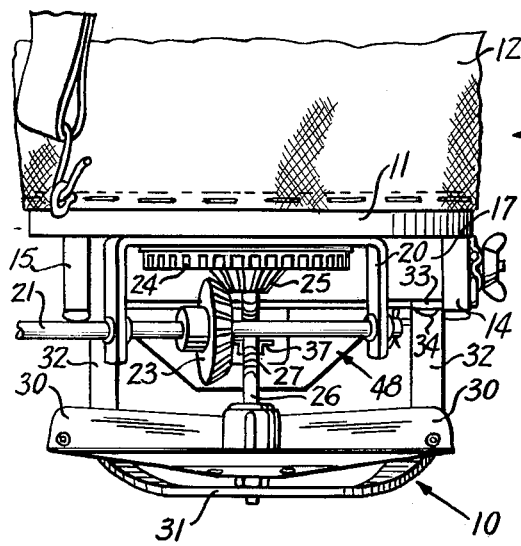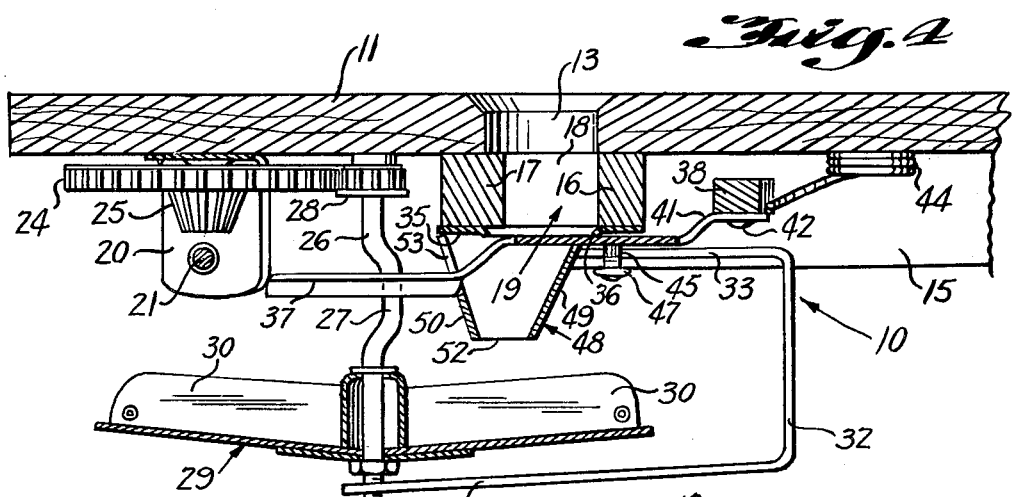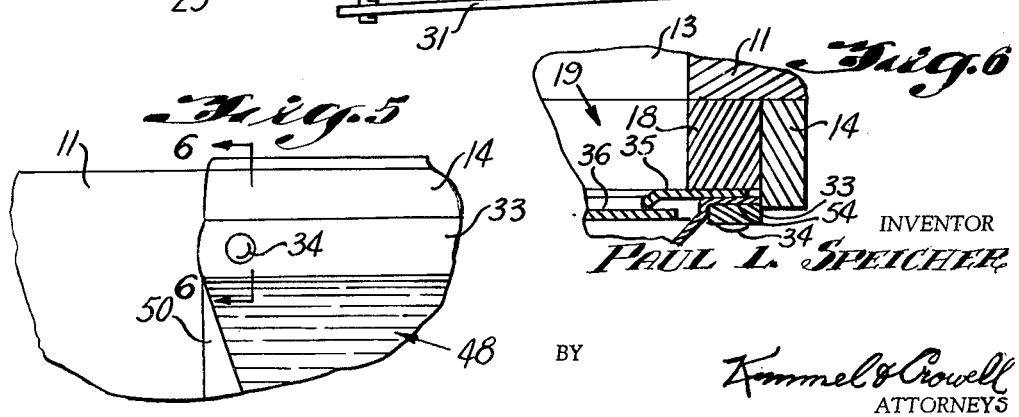

July 11, 1961 P. L. SPEICHER 2,992,008
BROADCAST SPREADER
Filed Oct. 27, 1959 3 Sheets-Sheet 3

INVENTOR
PAUL L. SPEICHER
BY
Kimmel & Crowell
ATTORNEYS

United States Patent Office 2,992,008
Patented July 11, 1961

1

2,992,008
BROADCAST SPREADER
Paul L. Speicher, Urbana, Ind., assignor to The Cyclone Seeder Co., Inc., Urbana, Ind., a corporation of Indiana
Filed Oct. 27, 1959, Ser. No. 849,001
8 Claims. (Cl. 275—12)

The present invention relates to a broadcast spreader of the type for use in seeding, fertilizing and similar operations.

The primary object of the invention is to provide a broadcast spreader in which the material being spread is discharged in a desired uniform pattern forwardly of the spreader.

Another object of the invention is to provide a broadcast spreader of the class described above in which the spread material is not thrown rearwardly toward the operator of the device.

A further object of the invention is to provide a broadcast spreader of the class described above in which the control of the spread material is effected by controlling the inlet point of the material to be spread when discharging it on to the spreading disk.

A still further object of the invention is to provide a broadcast spreader of the class described above which is inexpensive to manufacture, simple to use and which is completely effective in producing a pattern spread of the desired material.

Other objects and advantages will become apparent in the following specification when considered in light of the attached drawings, in which:

FIGURE 3 is a front elevation of the invention with parts broken away for convenience of illustration;

FIGURE 4 is an enlarged fragmentary vertical section taken along the line 4—4 of FIGURE 2, looking in the direction of the arrows;

FIGURE 5 is an enlarged fragmentary bottom plan view;

FIGURE 6 is a vertical sectional view taken along the line 6—6 of FIGURE 5, looking in the direction of the arrows;

Figure 1:
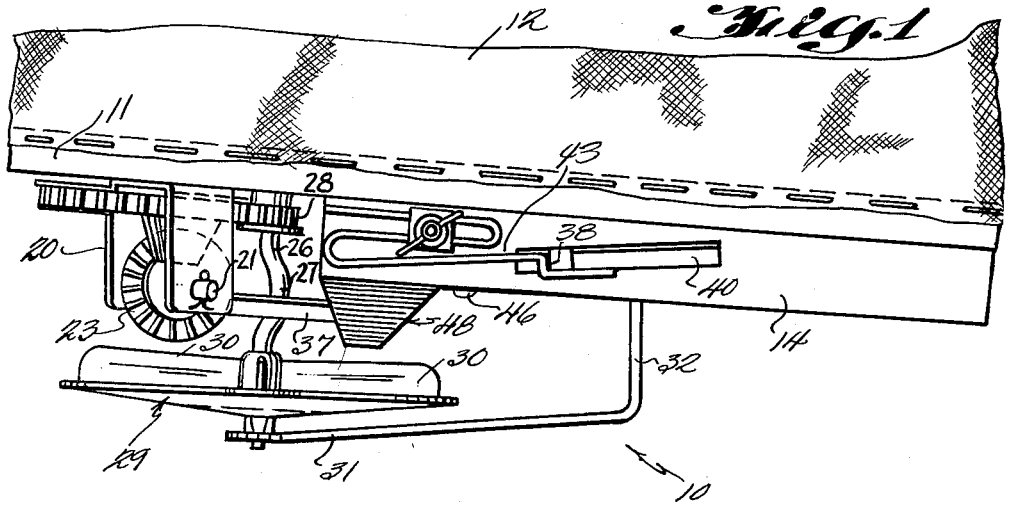
FIGURE 1 is a side elevation of the invention with parts broken away for convenience of illustration.
Figure 2:
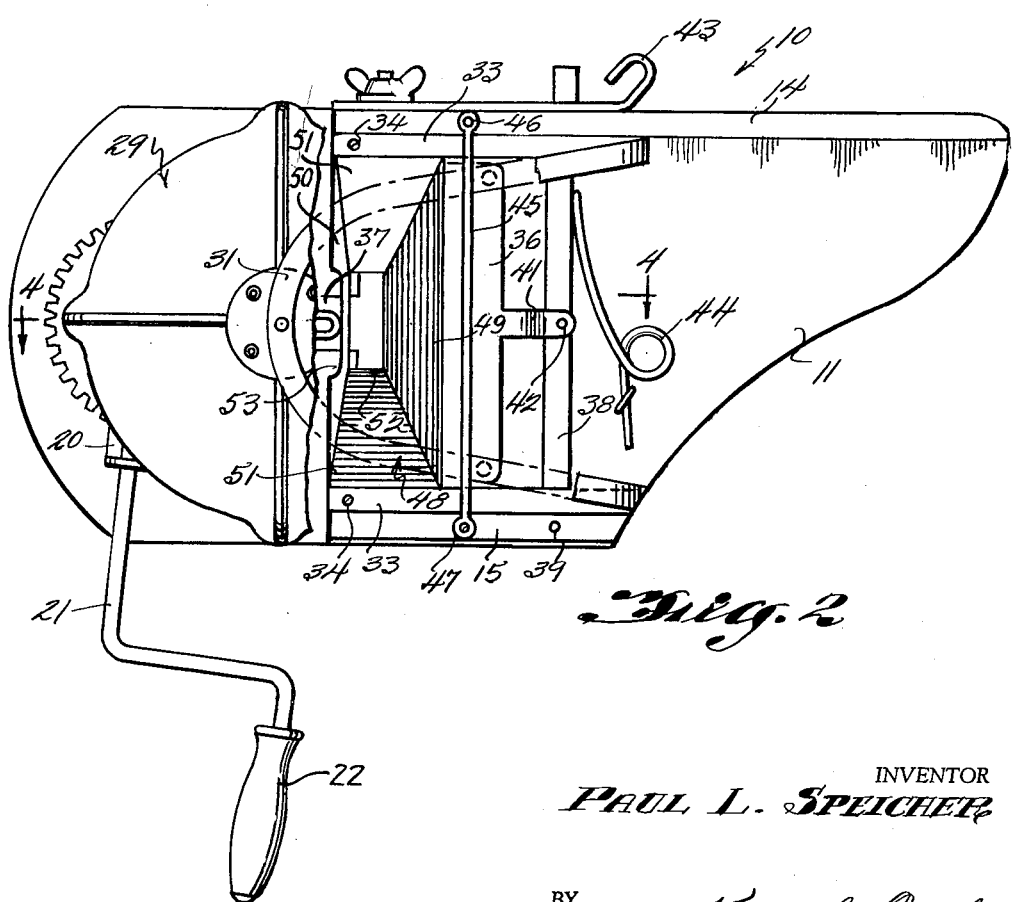
FIGURE 2 is a bottom plan view of the invention with parts broken away for convenience of illustration.

Referring now to the drawings in detail wherein like reference characters indicate like parts throughout the several figures, the reference numeral 10 indicates generally a broadcast spreader constructed in accordance with the invention.

The spreader 10 is of the type carried by the operator

2 and includes a generally horizontal base plate 11 having a hopper 12 secured thereto. The base plate 11 has a central opening 13 formed therein opening downwardly therethrough. A pair of spaced parallel rails 14, 15 are positioned to underlie the base plate 11 in depending relation thereto.

A transverse bar 16 extends between the rails 14, 15 rearwardly of the opening 13 and is secured to the base plate 11, as can be clearly seen in FIGURE 4. A second bar 17 is arranged in spaced parallel relation to the bar 16 between the rails 14, 15 and is positioned forwardly of the bar 16 at the forward edge portion of the opening 13. A pair of spacer blocks 18 are positioned between the bars 16, 17 at the opposite ends thereof forming therewith a rectangular throat, generally indicated at 19, underlying the opening 13.

A generally U-shaped bracket 20 is secured to the underside of the base plate 11 forwardly of the opening 13 and has a transversely extending crank shaft 21 journalled therein.

A crank handle 22 is integrally formed on one end of the crankshaft 21 for turning the crankshaft 21 by hand. A bevel gear 23 is fixed to the crankshaft 21 intermediate the opposite sides of the U-shaped bracket 20. A spur gear 24 is journalled on a vertical pivot to the center of the U-shaped bracket 20 and has a bevel gear 25 integrally formed thereon. The bevel gears 23, 25 are arranged in meshing relation so that the spur gear 24 is driven upon rotation of the crankshaft 21.

A shaft 26 is arranged on a vertical axis between the U-shaped bracket 20 and the opening 13 with its upper end journalled in the base plate 11. The shaft 26 has a centrally offset crank section or eccentric 27 integrally formed thereon. A relatively small spur gear 28 is fixedly secured to the shaft 26 in meshing relation with the spur gear 24, as can be seen in FIGURE 4.

A shallow concave spreader disk, generally indicated at 29, is fixedly secured to the shaft 26 adjacent the lower end thereof and has a plurality of radially extending upstanding flanges 30 formed thereon.

A generally horizontal U-shaped support 31 engages the lower end of the shaft 26 and provides a bearing support therefor. The U-shaped support 31 has a pair of perpendicularly offset extensions 32 arranged in spaced parallel relation with a pair of forwardly extending spaced parallel bars 33 integrally secured to their upper ends. Securing elements 34 fasten the bars 33 to the bars 16, 17 at the opposite ends thereof.

A centrally apertured metal plate 35 is secured to the bottom of the throat 19 by means of the bars 33. A valve plate 36 is arranged in contact with the apertured plate 35, as can be seen in FIGURE 4, and is provided with a downwardly and forwardly offset yoke 37 which engages the crank portion 27 of the shaft 26 so that upon rotation of the shaft 26 the valve plate 36 is oscillated from side to side.

A lever 38 has one end thereof secured to the rail 15 by a pivot pin 39. The lever 38 extends transversely of the base plate 11 spaced therebelow and extends through a slot 40 formed in the rail 14. The valve plate 36 has a centrally positioned upwardly offset tongue 41 integrally secured to the edge thereof opposite the yoke 37. The tongue 41 is secured to the intermediate portion of the lever 38 by a pivot pin 42. Pivotal movement of the lever 38 within the confines of the slot 40 effects a fore and aft movement of the valve plate 36 with respect to the throat 19, while the yoke 37 remains in contact with the crank portion 27 of the shaft 26.

A longitudinally adjustable spring stop 43 is supported on the rail 14 and can be used to maintain the lever 38 in an open position. A coil spring 44 is secured to the underside of the base plate 11 and bears against the lever 38, normally biasing the lever 38 to a position wherein the valve plate 36 closes the throat 19.

A rod 45 extends transversely of the spreader 10 and has its opposite ends 46, 47, respectively, secured to the rails 14, 15. The rod 45 supports the valve plate 36 for sliding movement with respect to the apertured metal plate 35.

A spout, generally indicated at 48, is of generally rectangular form and has a downwardly and forwardly sloping rear wall 49, a downwardly and rearwardly sloping front wall 50, and a pair of oppositely disposed downwardly and inwardly sloping side walls 51. The walls 49, 50, 51 are integrally secured together and terminate in a generally rectangular discharge opening 52.

The front wall 50 of the spout 48 has a central aperture 53 through which the yoke 37 extends. The side walls 51 of the spout 48 are provided with upwardly and outwardly offset flanges 54 which engage between the bars 33 and the blocks 18 to secure the spout 48 in underlying relation to the throat 19. As can be clearly seen in FIGURE 4, the discharge opening 52 of the spout 48 is positioned forwardly of the throat 19 so that the point that the material discharged through the discharge opening 52 strikes the disk 29 is controlled by the discharge opening 52 of the spout 48.

Figure 8:
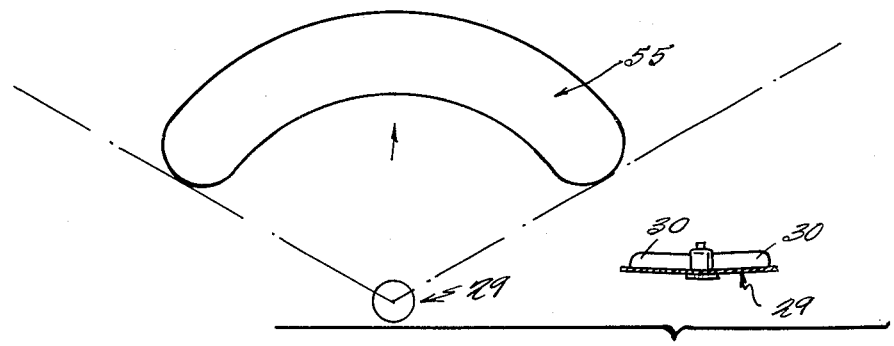
FIGURE 8 is a diagrammatic plan view of the pattern of distribution of the disk shown in FIGURE 7.

By controlling the position that the material strikes the disk 29, the pattern of discharge forwardly of the spreader 10 is also controlled, and as can be seen from FIGURE 8 an arcuate area, generally indicated at 55, is normally formed by the disk 29. The lower edge of the downwardly and forwardly sloping rear wall 49 controls the outermost position of the discharge of material from the spout 48 on to the disk 29 and, hence, specifically controls the pattern of discharge from the disk 29. The spout 48 guides all of the material coming through the throat 19 so that none of the material will strike the disk 29 radially outwardly on the disk 29 beyond the lower edge of the rear wall 49.

With the instant invention the spout 48 positions the discharge of material flowing therethrough so that the material strikes the disk 29 within a fixed radial distance from the center thereof with the material extending inwardly toward the center of the disk 29 as the flow increases. While a specific form of hand power drive has been illustrated, it should be understood that other mechanical as well as electrical drive systems may be used within the scope of the invention.

Figure 10:
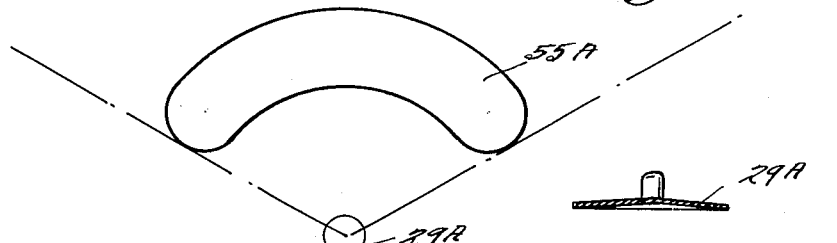
FIGURE 10 is a diagrammatic plan view of the pattern of distribution of the disk shown in FIGURE 9.
Figure 9:
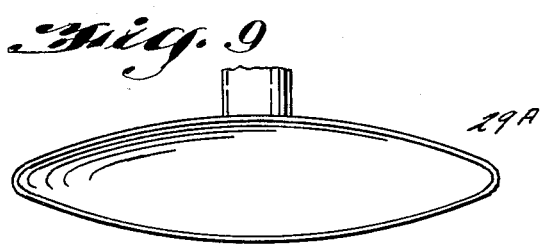
FIGURE 9 is a perspective view of a modified form of spreader disk removed from the spreader.

In FIGURES 9 and 10 a convex spreader disk 29A is illustrated as a modified form of the invention. An arcuate area 55A is shown in FIGURE 10, illustrating the pattern of discharge of the spreader 10 when using the disk 29A therein. The disk 29A is formed without flanges.

Figures 7, 11, 12:
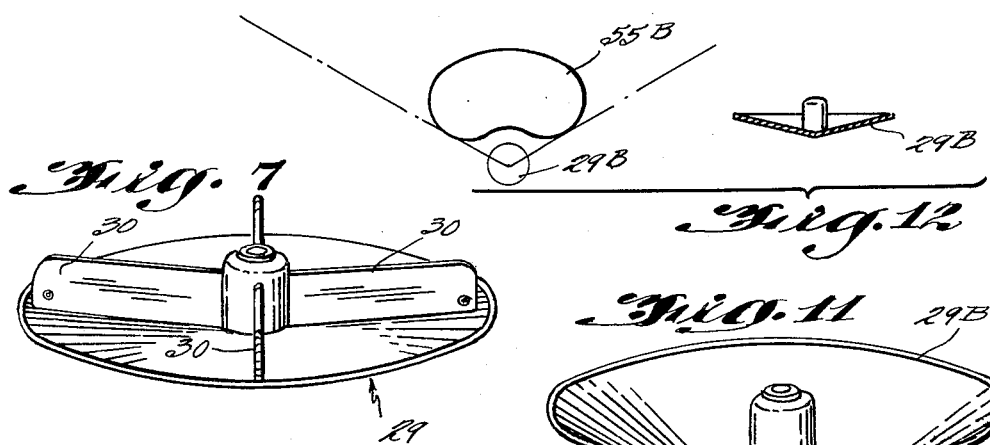
FIGURE 7 is a perspective view of the spreader disk removed from the spreader.
FIGURE 11 is a perspective view of another modified form of spreader disk removed from the spreader.
FIGURE 12 is a diagrammatic plan view of the pattern of distribution of the disk shown in FIGURE 11.

In FIGURES 11 and 12 a concave spreader disk 29B is illustrated as another modified form of the invention. The concave spreader disk 29B is somewhat deeper than the disk 29 and is formed without flanges. In FIGURE 12 an arcuate area 55B is illustrative of the pattern of discharge of the disk 29B when used with the spreader 10.

The spout 48 causes the discharged material to strike the desired spreader disk 29, 29A or 29B in such a manner that even distribution is obtained across the full width of the spread throughout the respective patterns of discharge.

The disks 29, 29A and 29B may be interchanged to regulate the spread width of the pattern of discharge to suit the needs of a specific spreading operation. This can be clearly seen in FIGURES 8, 10 and 12 where the respective patterns of discharge are illustrated.

Having thus described the preferred embodiments of the invention, it should be understood that numerous structural modifications and adaptations may be resorted to without departing from the scope of the appended claims.

What is claimed is:

1. A broadcast spreader comprising a generally horizontal bottom wall, a depending slotted rail secured to said bottom wall, a hopper extending upwardly from said bottom wall, a shaft depending substantially vertically from said bottom wall and having its upper end journalled for rotation therein, means on said bottom wall connected to said shaft for rotating said shaft, a generally circular impeller distributor fixedly mounted on said shaft adjacent the lower end of said shaft, said bottom wall having a transversely extending aperture formed therein between said shaft and the rear of said hopper with said aperture positioned in overlying relation to a rear portion of said impeller distributor, a valve plate underlying said aperture, means supporting said valve plate beneath said bottom wall for sliding movement with respect to the aperture in said bottom wall, an eccentric on said shaft, a yoke extending from said valve plate and engaging said eccentric for oscillating said valve plate beneath said aperture, a lever pivotally secured at one end to said bottom wall and at an intermediate point to said valve plate and having its free end extending through the slot in said rail for moving said valve plate relative to said aperture, a longitudinally adjustable spring stop on said rail engageable with the free end of said lever for limiting movement thereof, a spring secured to said bottom wall engaging said valve plate normally biasing said valve plate toward aperture closing position, and a generally rectangular spout underlying said aperture for receiving material dropped through said aperture, said spout fixing the radial outer edge of the material discharged on to said impeller distributor whereby the laterally equally distributed forward pattern of discharge of material will remain substantially unchanged when the rate of discharge past said valve plate is varied by adjustment of said valve plate.

2. A device as claimed in claim 1 wherein the means for rotating said shaft includes a hand operated crank.

3. A device as claimed in claim 1 wherein said spout has a generally rectangular discharge opening with said discharge opening being longitudinally offset with respect to the aperture in said bottom wall.

4. A device as claimed in claim 1 wherein said valve plate extends through the upper portion of said spout and controls the flow of material from said aperture in said bottom wall to said spout.

5. A device as claimed in claim 1 wherein means are provided for supporting the lower end of said shaft with said means securing said spout to said spreader.

6. A device as claimed in claim 1 wherein said distributor is concave on the seed engaging side thereof and is provided with a plurality of radially extending upstanding flanges supported thereon.

7. A device as claimed in claim 1 wherein said distributor is convex on the seed engaging side thereof.

8. A broadcast spreader comprising a generally horizontal bottom wall, a depending slotted lever support secured to said bottom wall, a hopper extending upwardly from said bottom wall, a rotatable shaft extending downwardly substantially vertically from said bottom wall, means adjacent said bottom wall connected to said shaft for rotating said shaft, a generally circular impeller distributor affixed to the lower end of said shaft, said bottom wall having a transversely extending aperture formed therein positioned above an intermediate portion of said impeller distributor, a valve plate underlying said aperture, means supporting said valve plate beneath said bottom wall for sliding movement with respect to the aperture in said bottom wall, an eccentric on said shaft, a yoke extending from said valve plate and engaging said eccentric for oscillating said valve plate beneath said aperture, a lever pivotally secured at one end to said bottom wall and operatively connected to said valve plate and having its free end portions extending through the slot in said lever support for adjusting said valve plate relative to said aperture, an adjustable spring stop on said lever support engageable with the free end portion of said lever for limiting movement thereof, a spring secured to said bottom wall operatively connected to said valve plate normally biasing said valve plate toward aperture closing position, and a spout underlying said aperture for guiding material dropped through said aperture onto said impeller distributor, said spout fixing the radial outer edge of the material discharged onto said impeller distributor whereby the laterally equally distributed forward pattern of discharge of material will remain substantially unchanged when the rate of discharge past said valve plate is varied by adjustment of said valve.

References Cited in the file of this patent

UNITED STATES PATENTS

| Re. 3,075 | Floyd | Aug. 11, 1868 |

FOREIGN PATENTS

| 266,226 | Germany | Oct. 25, 1913 |
| 373,812 | Italy | Aug. 4, 1939 |